United States Patent [19]
Oliver

[11] Patent Number: 5,468,946
[45] Date of Patent: Nov. 21, 1995

[54] METHOD AND APPARATUS FOR DECODING MULTI-LEVEL BAR CODES OR BI-LEVEL BAR CODES

[75] Inventor: James A. Oliver, Webster, N.Y.

[73] Assignee: Eastman Kodak Company, Rochester, N.Y.

[21] Appl. No.: 236,431

[22] Filed: Apr. 29, 1994

[51] Int. Cl.[6] ........................................ G06K 7/10
[52] U.S. Cl. .............................. 235/462; 235/463
[58] Field of Search .......................... 235/462, 463

[56] References Cited

U.S. PATENT DOCUMENTS

| | | | |
|---|---|---|---|
| 4,567,361 | 1/1986 | Rosenthal | 235/462 |
| 4,687,912 | 8/1987 | Ohta | 235/43 |
| 4,873,426 | 10/1989 | Sarno et al. | 235/462 |
| 4,992,650 | 2/1991 | Somerville | 235/463 |
| 5,077,463 | 12/1991 | Sato | 235/463 |
| 5,142,130 | 8/1992 | Sato | 235/462 |
| 5,196,685 | 3/1993 | Izumi | 235/472 X |
| 5,210,397 | 5/1993 | Eastman | 235/436 |

*Primary Examiner*—Donald Hajec
*Assistant Examiner*—Steven Wigmore
*Attorney, Agent, or Firm*—Dennis R. Arndt

[57] ABSTRACT

This is a bar code decoding method and apparatus that decodes the bar codes from digital video data. The apparatus will decode multi-level bar codes, as well as bi-level bar codes, but only a single format bar code at any given time. Data acquisition is via an optical scanner that generates a data signal that is converted into a run-length pixel count of pixels per bar or space. An array of twelve latches sequentially stores the run-length data while a programmable, high-speed math module sums the pixel count for a predetermined number of elements. Multi-level thresholds are established and the pixel count of a given element is compared to a multiple range of pixel counts used to define the number of modules per element. The module count of each element is compared to a predetermined start or stop code pattern. Look-up tables are then used for character decoding based on the module count of each element after the start code has been detected.

20 Claims, 8 Drawing Sheets

METHOD AND APPARATUS FOR DECODING MULTI-LEVEL BAR CODES OR BI-LEVEL BAR CODES

TECHNICAL FIELD OF THE INVENTION

The present invention relates to a method of reading bar codes and an apparatus therefore, and more particularly, to the decoding of multi-level bar codes or hi-level bar codes.

BACKGROUND OF THE INVENTION

As known, bar codes contain information encoded by the ratio of the widths and sequence of the black bars and intervening white spaces. The code may be read by rapidly sweeping a spot of light, such as with a rotating mirror, across the entire bar code pattern. Reflection of light from the spaces and absorption of black bars are sensed by the scanner's photodetector causing a varying level signal to be inputted to the decoder. The signal level thus fluctuates with the bars and spaces and is representative of the coded bar pattern. The scanned image is converted to a single bit data stream where the bars and spaces of the printed bar code will be measured by respective clock periods.

The current state of the art in bar code decoding is comprised of decoding in software and in hardware. Software methods are extremely slow in relation to hardware decoding schemes. Currently, a minimum valid bar code bars or spaces are about four pixels in a 400 dpi (dots per inch) system and would take about 400 nanoseconds to complete a run-length-encoded element. Each pixel would be about ¼ of this and the decoder must be able to process all possible transitions even if it is a single pixel transition. If the succeeding bar code decoder can decode run-length encoded elements at the rate of 200 nanoseconds then single pixel run-length-encoded elements of about 100 nanoseconds would cause an error in processing.

There are a number of applications where a raster of video data of a scanned document contains a bar code that is required to be extracted from the video data at a real-time video rate. In this type of situation, there is a need to decode bi-level and multi-level bar codes continuously from the digital video data. The term "multi-level" bar code refers to all bar code formats that utilize more than two widths for a given bar or space while a bi-level bar code refers to a format that uses only two widths (wide and narrow) for a bar code character.

The following general description of bi-level and multi-level bar codes is in order to understand some of the concepts in the detailed description. There are many bar code formats. Some of the bi-level formats use a combination of wide and narrow bars and wide and narrow spaces. The wide to narrow width ratio of these bi-level bar codes are about 2:1 to 2.2:1. This ratio may vary with print quality or even scanning speed of some systems. Multi-level bar codes encode more data into each bar and space by employing a four-level width format.

There is no fixed size for bar codes, but rather a range of (min/max) for bars or spaces. This requires automatic scaling of the input data in a proportional or ratio metric manner such that specific physical measurements of the bars and spaces are not critical to decoding. Documents that contain additional information regarding this subject can be found in *American National Standard For Materials Handling*, Document No. NH10.8N-1983 and the *Uniform Symbology Specification—USS*-128, by the automatic identification manufacturers.

A general description of a target multi-level bar code known as "USS-128" (commonly referred to as code-128 or bar code-128) will be used as an illustration in conjunction with the described embodiments. Bar code-128 is a multi-character bar code that comprises three bars and three spaces per character of the bar code. The overall format of the bar code is that it is made up of a series of individual characters. The format consists of (1) a start character, (2) variable number of data characters, (3) a check character, and (4) a stop character. A quiet zone is sometimes used and is an area of white space with a specified width in front of and/or behind the bar code string.

Each code-128 character consists of 11 "modules". Each character always has three bars and three spaces. Code-128 comprises spaces that have widths of one, two, three or four modules. A bar or space of one "module" is the narrowest bar or space while a bar or space with a module count of 4 is the widest for this code. For a character to be valid, the number of modules for all six bars and spaces must add up to 11 modules and be in the valid code table. Each element or module could be any number of pixels. This depends on the printed physical size of the bar code on the document and the resolution of the scanning device. The minimum specified limit for individual bars or spaces of module length 1 is about 0.007 inches. At 400 dpi (dots-per-inch) for a scanning camera this is 0.0025 inches per pixel, which is approximately three pixels wide for the minimum bar or space width. There are three start codes and one stop code in the USS-128 format. The start code is what is used to lock onto the multiple thresholds used to differentiate between the specific levels of bars or spaces in the bar code.

U.S. Pat. No. 4,873,426, issued Oct. 10, 1989, entitled "Technique for Reading Bar Codes", describes a method whereby a bar code character can be located and decoded from a bit-map image. The decoding is done by a software analysis of the bit-map image being compared to known patterns. Use of any type of software to detect a bar code generally results in much greater decoding times than those compared to methods that do not incorporate a microprocessor to analyze the incoming data to the system.

U.S. Pat. No. 4,687,912, issued Aug. 18, 1987, entitled "Bar Code Reading Method and Apparatus", discloses a method implemented completely in software that assists in the decision-making process for the determination of what is a bar or a space and what level of width is the bar or space. This type of software implementation attempts to provide accurate decoding of bar codes and may have slight variations in the scanning speed or slight variations of the bar code print quality.

U.S. Pat. No. 5,077,463, issued Dec. 31, 1991, entitled "Bar Code Reading Apparatus" discloses a hardware mechanism that is used to detect the margin of guard bars that were found in a specific bar code format. Guard bars, in this instance, are a pair of vertical bars of a specified width with the same width and space between them that are typically located before, after and/or in some formats in the middle of the bar code. Some bar code formats and/or decoders use guard bars as a means for calibrating and setting up the decoder for the bar code characters that are to follow.

U.S. Pat. No. 4,567,361, issued Jan. 28, 1986, entitled "Reticle Bar Code and Method and Apparatus for Reading Same" describes a specific bar code format and apparatus for reading that format and is primarily intended for use in micro-lithographic reticles that are used in semiconductor manufacturing and is not intended to be a public bar code type of format.

SUMMARY OF THE INVENTION

The present invention provides a bar code decoding apparatus and a method of decoding the bar codes from a digital video data. This apparatus decodes bar codes completely with the use of hardware and at speeds not attainable with conventional bar code decoding apparatus. The system will decode multi-level bar codes as well as bi-level bar codes but only a single format bar code at any given time. The system is comprised of eight basic sections: (1) data acquisition and preparation; (2) an array of twelve latches; (3) a programmable, high-speed math module; (4) generation of multi-level thresholds; (5) threshold lock range comparators that extract the data from the run-length encoded pixel count via the previously generated thresholds; (6) start and stop code detection circuitry; (7) character decode and look-up tables and miscellaneous sequence and logic; and (8) post-processing of the data and delivery to the host system.

The present invention further provides a bar code reading apparatus for reading printed bars and spaces each defining an element having a predetermined number of modules per bar or space with a predetermined number of elements forming a character in the bar code. The apparatus comprises means for scanning an item and generating a data signal and means for converting the data signal to a run length count per element. Also, means are provided for loading the next element's run length count into a sequential latch array and summing the run length counts for a predetermined number of elements in the sequential latch array. The run length count in each latch in the sequential latch array is then compared to a plurality of threshold values to determine if the run length count is within a range associated with a valid bar code element and then determine the number of modules associated with each element. Means are provided for identifying an initializing pattern and then accessing a look-up table to decode character information based on the number of modules in each element after detection of the initializing pattern.

Further options, features and advantages of the present invention will become apparent from the following detailed description when read in conjunction with the accompanying drawings.

BRIEF DESCRIPTION OF THE DRAWING

Other features and advantages will become apparent upon reference to the following description of the preferred embodiment when read in light of the attached drawings.

DETAILED DESCRIPTION OF THE INVENTION

Figure 1:
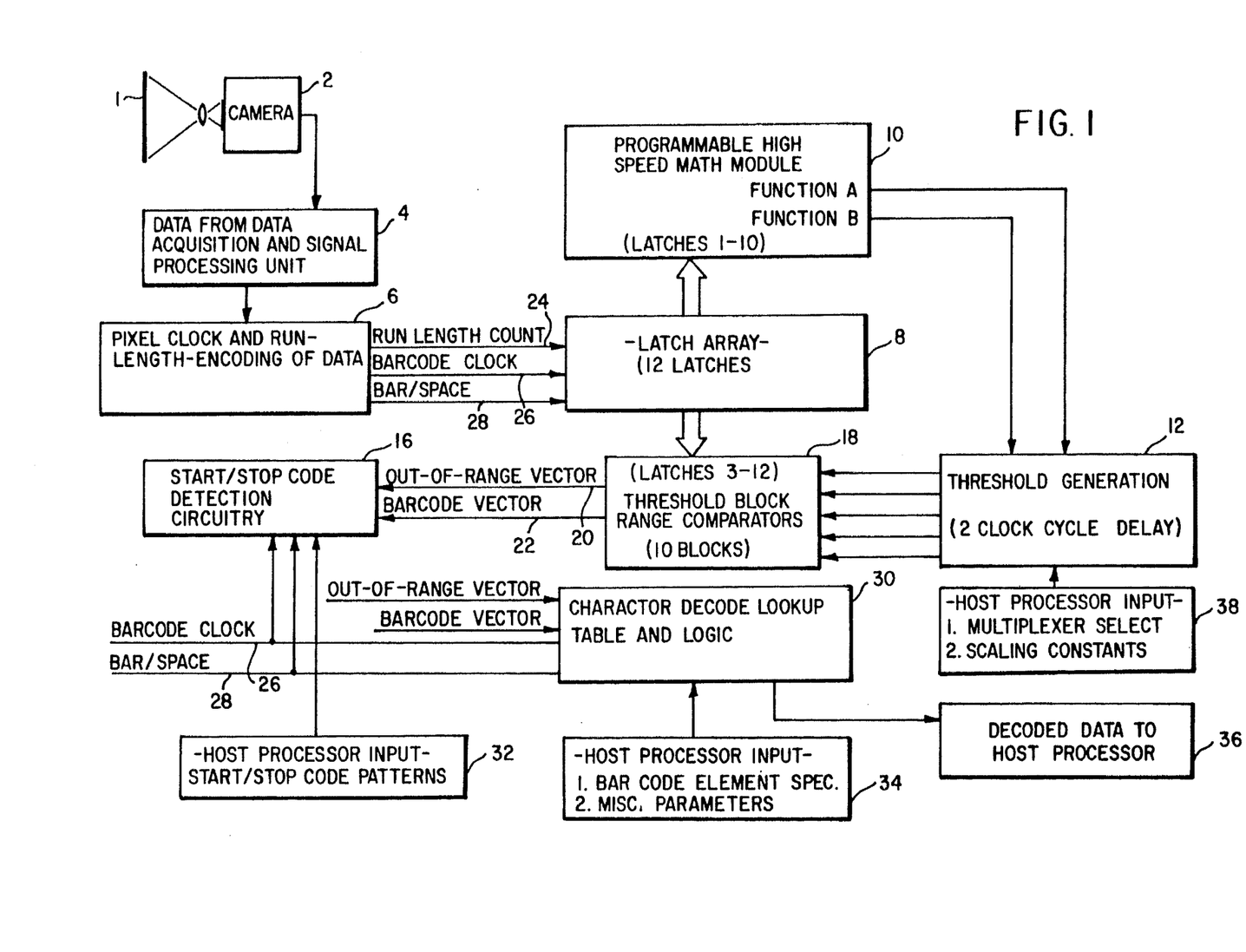
FIG. 1 is a block diagram of the bar code decoder illustrating the main box by function.

The block diagram of FIG. 1 shows the general flow of the signal in the preferred embodiment of the present invention. A description of the function of all of the modules follows with an example of an actual USS-128 (Uniform Symbol Specification) start code evaluation. This code was established as a standard by Automatic Identification Manufacturers, Inc. in 1983.

The beginning patterns that are specific to the target bar code format being decoded are called start codes and must be found in the input stream of data independent of the data acquisition system. Most bar code formats have a fixed start code. The start code could be a particular pattern or a particular character in the specified bar code format. It is the initial object to find a valid start code, detect and hold the threshold used in the generation of the start code detect.

The source of the input data to the decoder is any optical or electronic device such as a camera 2 to convert a printed image 1 of a bar code to an electronic data form. The optical apparatus shown in FIG. 1, item 2, illustrates the use of a camera to acquire the electronic representation of the image of a surface upon which the bar code is printed. Scanning camera 2 can take the form of a laser scanner, CCD camera, hand-held wand. Also, data from multiple acquisition devices could be compressed to form a multiplexed data stream equivalent to all the original data from each source received at a much higher rate. Scanning camera 2 digitizes the optical image by the use of an analog to digital converter ("ADC" hereinafter). The ADC produces a grey scale image data. This image data contains all imperfections or irregularities including poor print quality, document surface imperfections, or dust on the document or optical scanning components.

The grey scale data is then processed digitally through high speed digital signal processing filters in block 4 to provide selectable scan line averaging, dot matrix filters, and finally image thresholding to extract the bar code image from the background image that the bar code is printed on. The output is a bit stream of ones and zeroes that represent the black and white of the image scanned.

Figure 2:
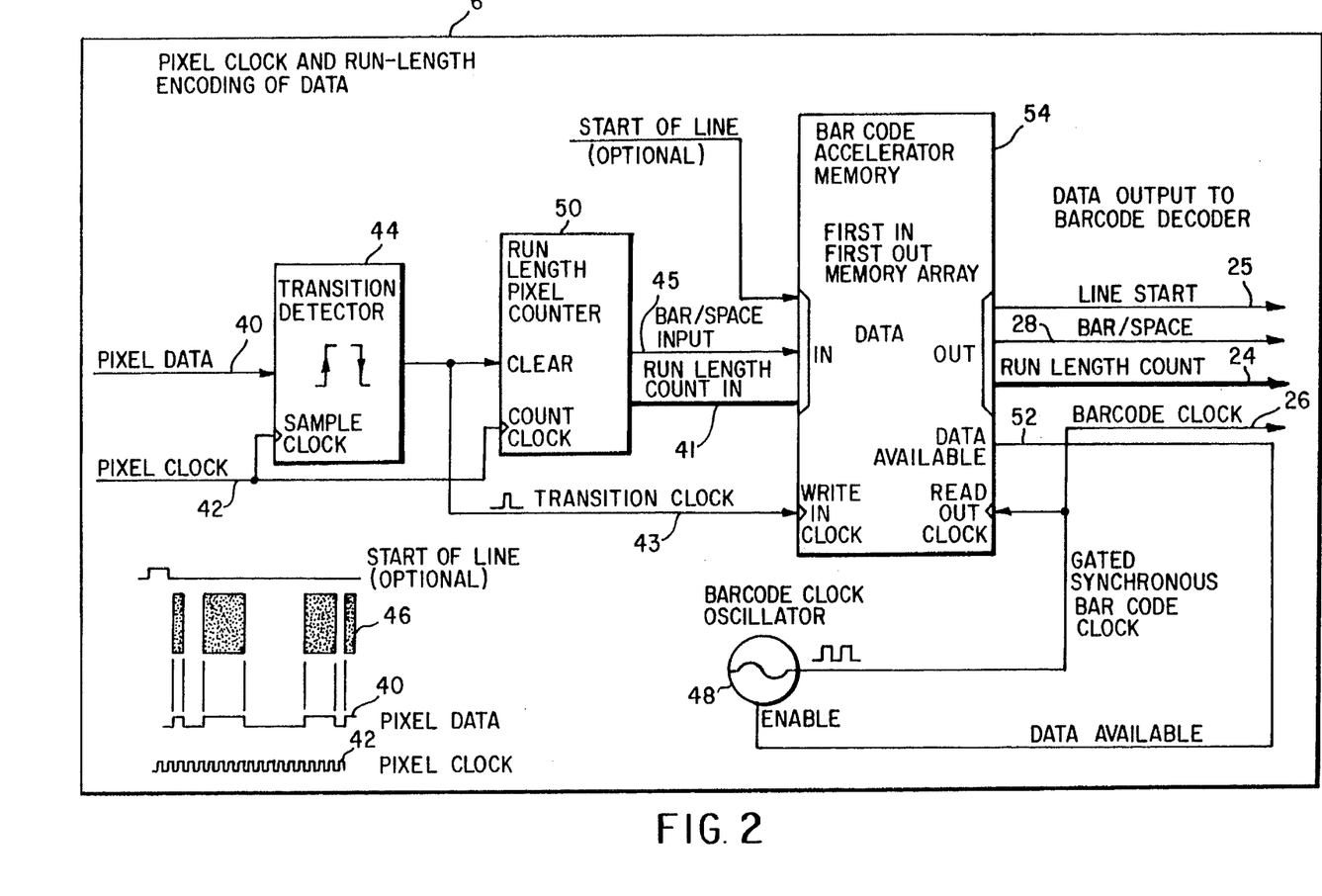
FIG. 2 illustrates the method of conversion from pixel clock and data to run-length-pixel count bar code accelerator memory and the generation of the bar code system clock.

FIG. 2 illustrates the conversion of the pixel clock 42 and the pixel data 40 to output run-length pixel count 24, bar/space sense data 28, and bar code clock 26. A transition of the pixel data 40 would be a white to black or black to white edge of an image on a document. The physical length of the white or black section of the image would be measured in pixels counted by run-length pixel counter 50. When there are no pixel data transitions at a pixel clock 42, then the run-length pixel counter 50 is incremented. The number of pixels for a given white or black section is referred to as the run-length-encoded pixel count. The pixel data transition detector 44 detects the change in the pixel data and outputs a transition clock 43. This causes the passing of the current run-length encoded pixel count 41, the bar/space sense input 45 and the optional start of line signal to be written into the bar code accelerator memory 54. After this, the run-length pixel counter 50 is cleared. When data is available from the bar code accelerator memory 54 by the assertion of the data available signal 52, this enables the bar code clock oscillator to produce a bar code clock 26. This gated synchronous bar code clock 26 clocks out the next run-length pixel count 24. Line start 25 and bar/space sense data 28 is passed on with the count 24 to the decoder such that proper determinations of a bar or space are made.

Latch array 8 in FIG. 1 contains an array of twelve input registers. These registers hold the last twelve run-length-encoded pixel counts of the black and white areas along a scan line of the scanned image. The black or white sense of the image is held by bar/space sense signal 28. The data in these registers feeds both the programmable high speed math module 10 and the ten threshold comparators in threshold block 18. The programmable high speed math module 10 is used to compute sums of the run-length-encoded pixel counts of specific bars and/or spaces for a specified bar code format. These numeric sums are passed to hardware multipliers in the threshold generation block 12 to compute upper and lower threshold numbers for the specified width of a bar or space expected in the start code or to decode characters after a start code has been detected.

Figure 3:
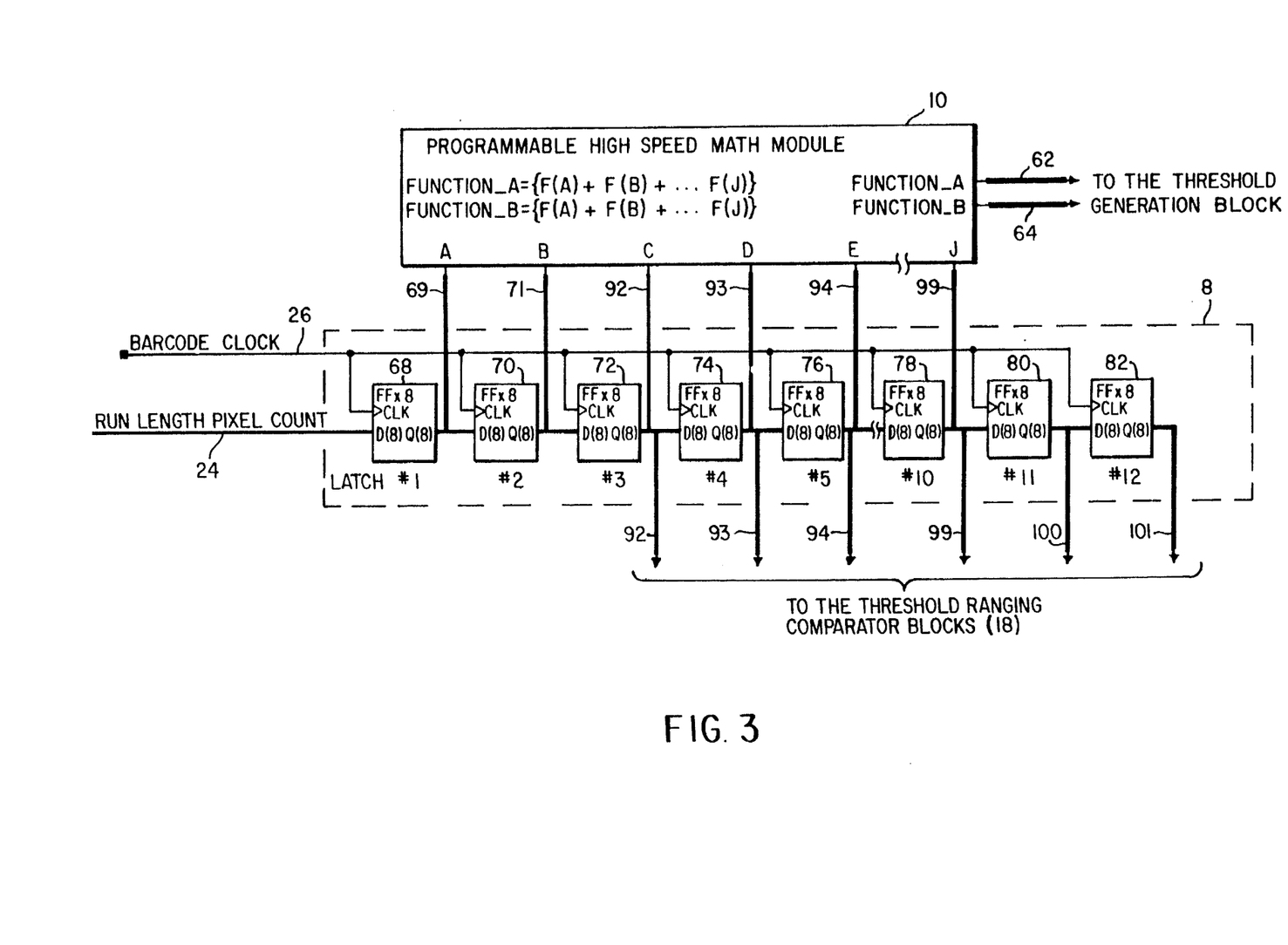
FIG. 3 illustrates the configuration of the latches and how the latch data is fed to both the main module, and after a delay of two clock cycles, is fed to the threshold ranging comparator block.

FIG. 3 shows the implementation of the latch array (68-82 of twelve latches) and the programmable high speed math module 10 with output function A 62 and function B 64. Function A and Function B are passed on to the hardware multiplier scalers for the generation of all five level thresholds. When a barcode clock signal 26 occurs, the run-length-encoded pixel count 24 from the bar code accelerator memory 54 (FIG. 2) feeds into first latch 68. Data that was in the first latch 68 is clocked into the second latch 70 and data that was in the second latch is clocked into the third latch 72 and so on for all twelve latches. Data exiting latches 72 through 82 to the threshold ranging comparator blocks are delayed by two-bar code clock cycles 26. This two-clock delay is necessary to allow for the two-clock cycles necessary to perform the math in the math module 10 and to perform the radiometric scaling performed in the hardware multipliers to follow in the threshold generation stage. This group of run-length-encoded data 92-101 (FIG. 3) is timed such that it is valid at the same time as the newly generated thresholds 136-140 (FIG. 4A) become valid.

At the barcode clock 26 (FIG. 3) significant edge, the math functions, function A 62 and function B 64 are required to be completed and stable so it can be processed by the threshold generation block 12 to follow. At this same time, new data is being presented to the math module from latches 68 through 78 in the latch array 8. The math module 10 is basically a programmable adder. It must add many numbers for some bar code formats and few for others. Some formats require only one sum while other formats require two separate sums, sum function A 62 and sum function B 64. The two functions can be represented as follows:

Function A=C1(A)+C2(B)+. . . C10(J)

Function B=D1(A)+D2(B) +. . . D10(J)

Constants C1 through C10 and D1 through D10 are programmable constants of either 1 or 0. Constants C1 through C10 and D1 through D10 are simply programmable constants of either 1 or 0 that switch in or out its associated run-length-encoded value A through J to the sum for Function A 62 or B 64. These constants are set up upon initialization of the system. This method allows for the summing of specific bars and/or specific spaces to compute a bar width sum for function A 62 or space width sum for function B 64. For the case of bar code format USS-128, only one function is necessary and that would be the sum of the first six elements in the math module 10, A through F. These six elements correspond to the six elements in a USS-128 bar code character. If the target bar code format was code 3 of 9, then function A 62 could be programmed to add all the wide and narrow bars in the bar code start character (two wide and three narrow) and function B 64 could be used to sum all the wide and narrow spaces in the code 3 of 9 start characters (one wide and three narrow). The summing functions along with the threshold generation circuits can be optimized by changing the constants as necessary.

Figure 4A:
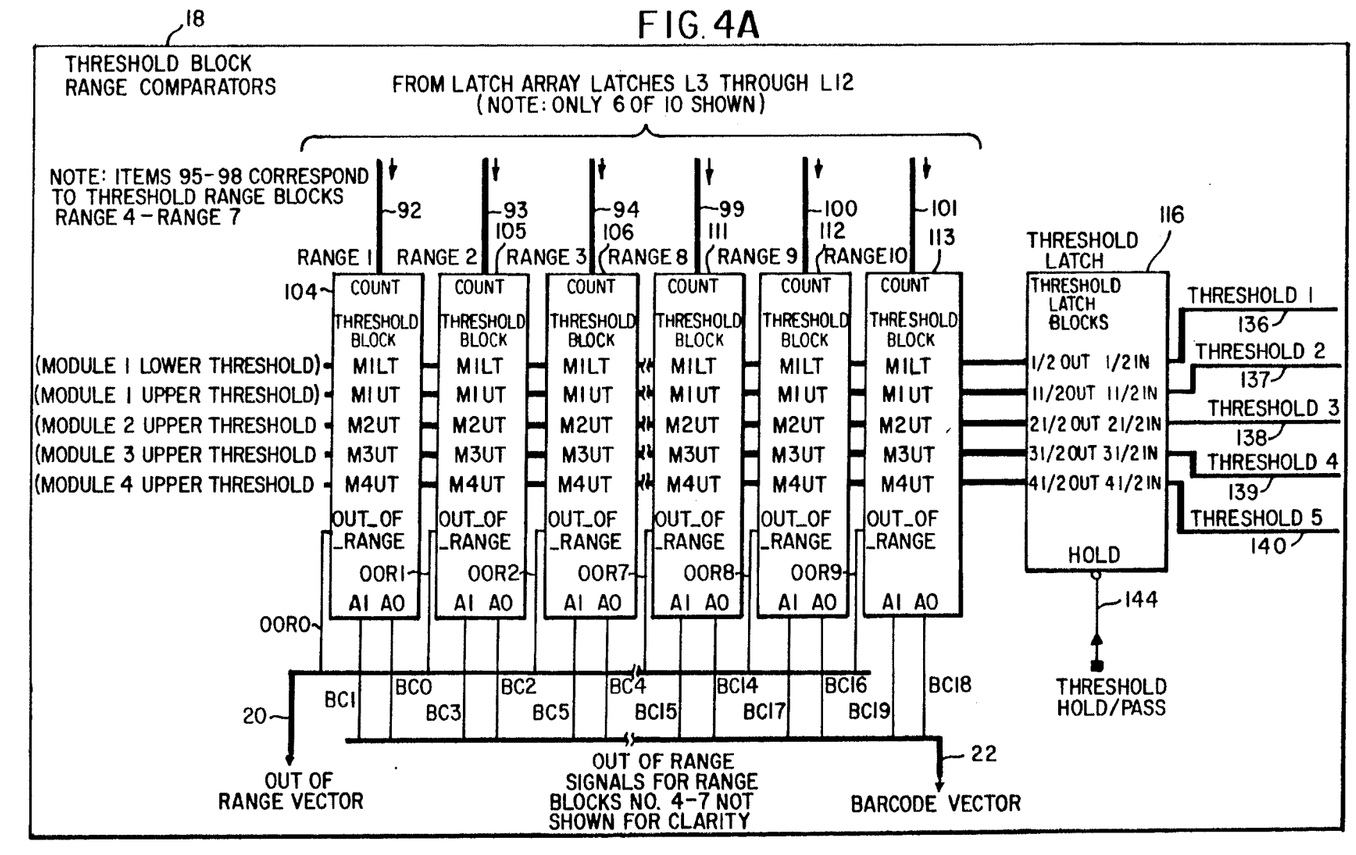
FIG. 4A illustrates the generation of the bar code vector from the latch data and thresholds.
Figure 4B:
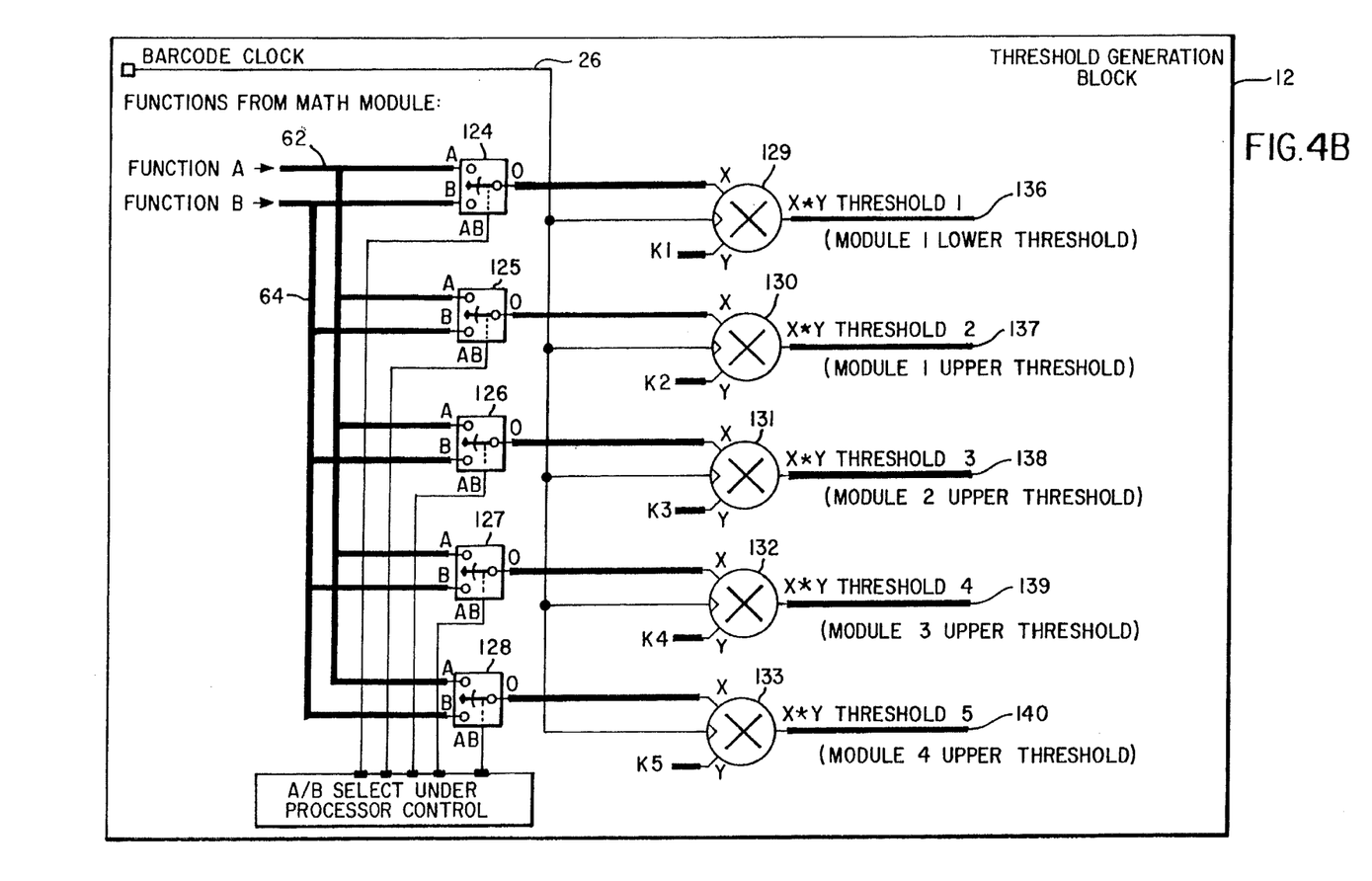
FIG. 4B illustrates the flow of data from the math module through the scaling multipliers to generate the five thresholds.

FIG. 4B illustrates how the previously generated sums, function A 62, and function B 64 are applied to the threshold generation multipliers. These sums are passed to the five multipliers 129-133 through five multiplexor switches 124-128. The five multiplexor switches 124-128 and the five multiplier constants K1 through K5 at multiplier port Y are programmable by the host processor 36. These are fixed at initialization. The sum functions going into multiplier port X and the constants going into port Y are loaded into the multiplier at the significant edge of the bar code clock 26. At the same time, the result from the previous multiply is clocked out of the multiplier and is present at signals threshold 1 136 through threshold 5 140.

The output of threshold block 18 (FIG. 1) is reduced to two out of range vectors 20 and bar code vector 22. The out-of-range vector 20 signifies that the image in the register array 8 is not in an allowable range to be a valid bar code character. If the out-of-range vector 20 shows that it is not out-of-range, then the 20 bits (2 bits from each of the 10 threshold range comparators) of the bar code vector 22 are analyzed and will indicate what module size each element is in the latch array 8. A bi-level bar code being analyzed would need only 1 of the 2 bar code level bits from each of the 10 thresholding comparator blocks to determine wide or narrow for each applicable element.

Because each bar code format is very different from one another, many functions of the hardware need to be configurable to the specifics of the bar code format. Some formats, for example, have inter-character spaces and some do not. Also, some formats require only a single math function (see FIG. 3) such as bar code format USS-128. Bi-level bar code formats can be optimized using two math functions. One can be optimized for measuring the width of the bars and the other can be optimized for measuring the width of the spaces. This improves read ratios and false start code detections. It has been found that specific areas that require set-up programming are in the math module 10 (FIG. 1), the thresholding block 12, the start and stop code detection circuits 16 and the character decode look-up table and logic 30 circuits. All programming is performed as a set-up function at initialization. It should be noted that the host processor remains basically idle in the decode process. Once a bar code has been detected and read, the host processor 36 evaluates the decoded data for valid characters and check sums, if appropriate, for the target bar code format. The host processor 36 re-initializes the hardware, as necessary.

In a multilevel bar code such as USS-128, the thresholds would be designed to be the upper and lower limits of all four bar or space widths. Each bar code-128 character consists of 11 modules. Each character always has 3 bars and 3 spaces and consists of bars and spaces that have widths of 1, 2, 3, or 4 modules. A bar or space of 1 module is the narrowest bar or space element, while a module count of 4 is the widest for this code. For a character to be valid, the number of modules for all 6 bars and spaces must add up to 11 modules and be in the valid code table. Each bar or space element could be any number of pixels. The lower limit for the narrowest bar or space is set for 0.5 modules. The upper limit for the narrowest bar or space is set for 1.5 modules, or halfway between the first and second module widths. The larger bars and spaces are equivalent to two, three and four times the unit module size or the narrowest bar or space. The lower limit for a module 2 width bar or space is the upper limit for the module 1 bar or space and so on for all four widths. If a run-length-encoded count is greater than the threshold generated for the level 4 upper threshold 140, then an out-of-range signal will be generated, FIG. 6, item 206. If a run-length-encoded count is less than the threshold generated for the level 1 lower threshold 136 (FIG. 4B), then an out-of-range signal will be generated, FIG. 6, item 208. These two out-of-range signals are logically ored by OR gate 198 to obtain a signal 214 that informs the start/stop code detect circuitry and the character decode circuitry that the current run-length encoded count for this bar or space element is not within any bar or space width threshold.

As an example for bar code format USS-128, the following thresholds can be designed to be as follows, threshold 1 136 corresponds to the module 1 lower limit, threshold 2 137 corresponds to the module 1 upper limit and module 2 lower limit. Threshold 3 138 corresponds to the module 2 upper limit and module 3 lower limit. Threshold 4 139 corresponds to the module 3 upper limit and module 4 lower limit. Threshold 5 140 corresponds to the module 4 upper limit only.

The bar/space thresholds 136-140 (FIG. 4A) are generated at every significant edge of the bar code clock and are present at the input to the threshold latch block 116. If a start code for the target bar code format has been detected, the hold input 144 will be low forcing the latch to hold the last calculated thresholds. At this point, the thresholds will usually be fixed. In the event the target image is either being scanned at a non-fixed rate or the image scale is changing, it may be desirable to re-acquire new thresholds at the beginning of each new character in the bar code. This will allow the thresholds to adapt to the image and/or scanning device. The threshold latch block will usually hold the thresholds until a stop character has been read. In the event a stop character is missed, internal logic will terminate the read.

Figure 6:
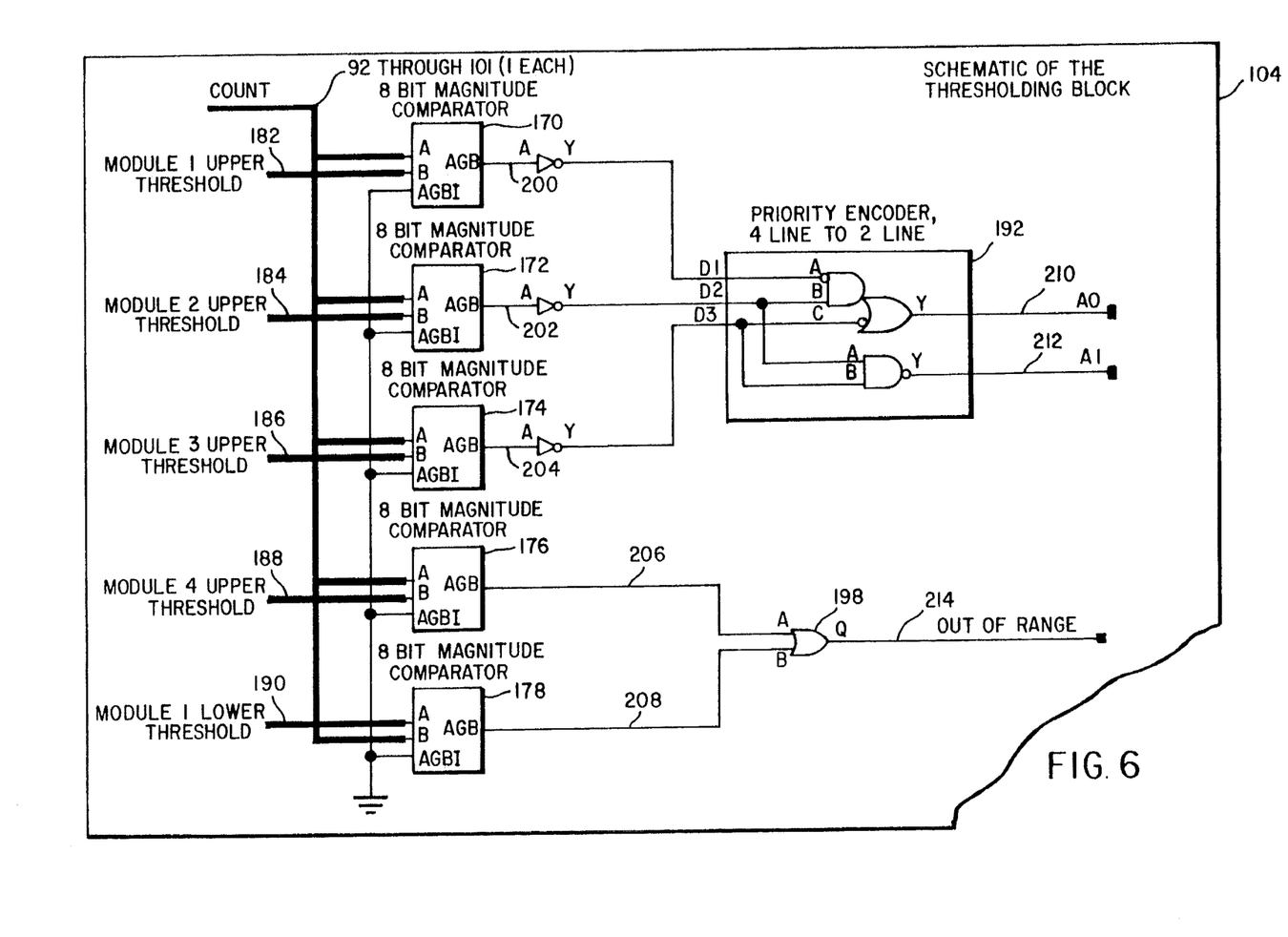
FIG. 6 is a schematic diagram of one of ten thresholding blocks and it illustrates the conversion of the run-length-pixel count and the five thresholds and reduces the vectors to three bits of data.

The thresholds are passed from the threshold latch block 116 to the ten threshold blocks 104-113. The components of each of the ten threshold blocks are shown within FIG. 6. Three magnitude comparators 170, 172, 174 are implemented to compare the run-length-encoded pixel counts 92-101 (FIG. 4A) for a specific bar code element with three level thresholds 182, 184, 186 (FIG. 6). The outputs 202, 204, 206 from these magnitude comparators feed a priority encoder 192 that produces a two-bit binary number A1 found on line 212 and A0 found on line 210. The fourth input to the priority encoder 192 is not necessary as it would be the default. Two more magnitude comparators 176 and 178 are used to check if the input count is greater than the module 4 upper threshold 188 or less than the module 1 lower threshold 190. The purpose of these comparators is to determine if the run-length-encoded element being analyzed by the respective threshold block is ratiometrically proportional to the other appropriate bar code elements in the latch array. If the system is set up for bar code-128 decoding, then the comparators would alert the system that this bar code element is greater than a module of length 4 (comparator 176) or less than a module of length 1 (comparator 178). This generates two out-of-range signals 206, 208 that are logically ored 198 to produce a complete out-of-range signal 214 that has priority over the two-bit priority encoded binary output. For a valid start code, stop code, or valid bar code character to be read, all out-of-range signals must be false and the ten pairs of two-bit words must be of a valid pattern corresponding to a character of that bar code format. Depending on the start code element size, character element size, bi-level or multi-level bar code element threshold configuration, the pattern matching decoder lookup table or start/stop code detect circuitry will only need certain specific bits for operation.

Figure 5:
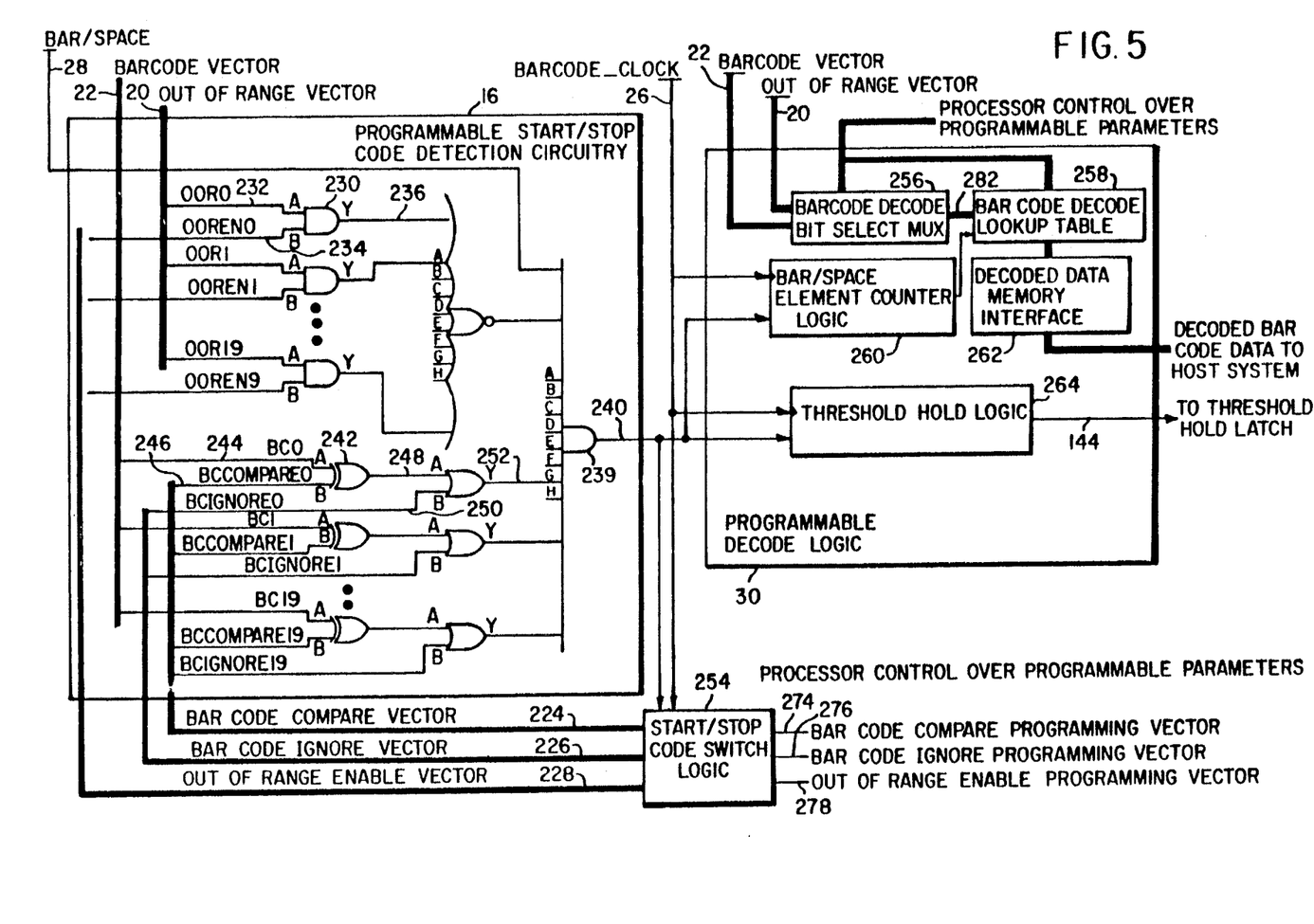
FIG. 5 illustrates how a start/stop code is detected in the location of some of the miscellaneous logic sections.

FIG. 5 illustrates the details of the start/stop code detection circuitry 16 and the block functions of the programmable decode logic. Start codes and stop codes are completely different in every bar code format. They have varying element lengths, and varying element patterns. The programmable start/stop code detection circuitry block 16 shows how a specific start or stop code pattern can be selected and searched for. Bar code vector 22 comprises the 20 matching pattern bits from the threshold range comparators. Only certain bits need be compared for the target bar code format. By the use of the barcode compare vector 224, the pattern can be set to match by the use of an exclusive OR gate 242. The output 248 of this OR gate 242 goes true if the pattern is matched. This signal is logically OR'ed with the appropriate bit 250 of the barcode ignore vector 226. This selects if this bit is a necessary bit for the start or stop code detect pattern. If the bit is not necessary in the detection of the bar code, then the barcode ignore bit 250 is high and forces a high 252 at the output of the OR gate. In a similar fashion, the out-of-range vector 20 contains the ten individual out-of-range bits. The out-of-range bit-0 232 is shown logically AND'ed with a bit 234 from the out-of-range enable vector 228. This enable bit selects if this out-of-range bit is a necessary element in the comparison for the start or stop code detect. If the out-of-range enable bit 234 is low, then the output 236 of AND gate 230 will always be low. This will disable the out-of-range bit-0 from the start/stop code detect equation. Multi-input AND gate 239 requires that all inputs to the gate be high for a valid start or stop code detect signal 240. Some bar code formats use multiple patterns in the start or stop code detections. In this case, the detection circuits 16 may be duplicated or customized for those applications. Once an initial start code has been detected, a start-stop logic switch 254 is activated that switches the programmable vectors (224, 226 and 228) that were previously set for the start code detection, will now be switched to search for the stop code character. This will allow the same array to be used for either start or stop code detection.

The programmable decode logic section 30 controls the specific decode operations for the target bar code format. The bar code decode bit selector multiplexor 256 selects the appropriate bits from the bar code vector 22 and the out-of-range vector 20 that are appropriate for the target format and elements of that format. These multiplexed bits 282 are passed to the bar code decoder lookup table circuits 258 which uses the pattern bits as an address to a memory device. The output of the memory device is the actual character or characters depending on the bar code format. Logic such as the bar/space element counter 260 is programmed with the element count of the target bar code format such that it can sequence the elements through the latch array and extract the correct data. This logic can be complex in the event a bar code format like the Universal Product Code (UPC) or European Article Numbering (EAN-8) is used because the bar code has breaks in the center for guard bars. There is also a change of encoded data format after the center guard bars. The threshold hold logic 264 is used to latch the current thresholds that were used in the generation of a valid start code 240. The output 144 connects to the threshold latch blocks 116 of FIG. 4A.

Step by Step Example of a Start Code Detect for Bar Code USS-128

The following will be an actual example using noisy pixel data as input to provide a simulated read of a start code in bar code format USS-128. A start code of bar code USS-128 version A is used and has the bar-space pattern 211412 (BSBSBS) where the digits correspond to the relative module widths. In the pattern above (211412), the left-most digit would be the left-most bar on a printed page and, therefore, is the first to be scanned and the first element to be input.

STEP 1

When a run-length-encoded pixel value is deemed valid (FIG. 3, item 24), the barcode clock 26 goes high. This clock shifts the run-length pixel data into latch #1 68. Data in each latch gets shifted to the next latch to the right on the significant bar code clock 26 edge. If a valid USS-128 start code A is to be scanned next, the left-most bar would be the one to be scanned first.

Figures 7A, 7B:
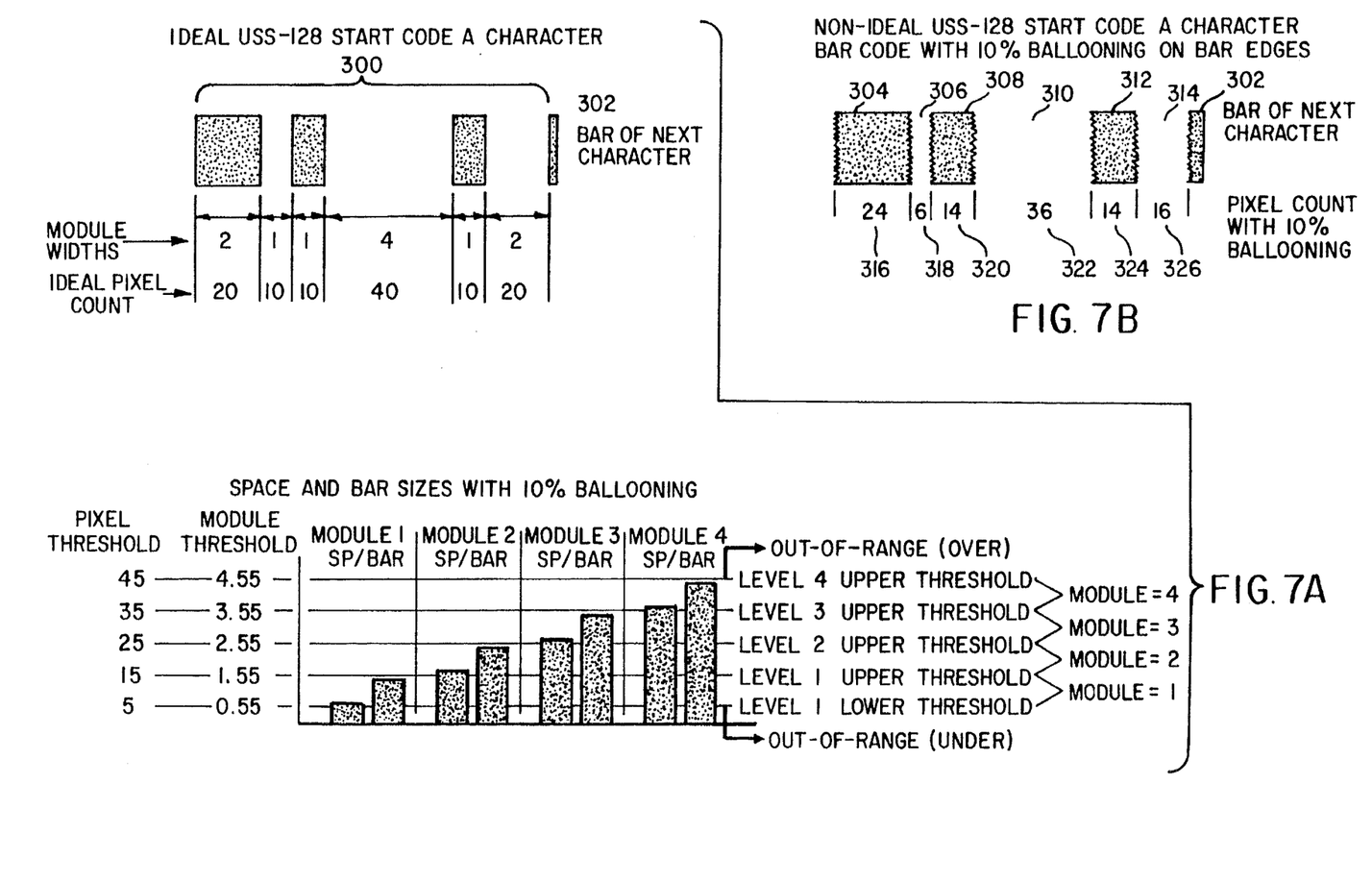
FIG. 7A illustrates an ideal USS-128 start code A character broken down by module.
FIG. 7B shows a poorly printed USS-128 start code A character with a 10% bar bleeding into each space and the resultant pixel count for each module.

FIG. 7A shows a USS-128 ideal start code A character 300. In a real world application, the bars and/or spaces won't be exactly the same proportional size. In many printing applications, the bars may bleed over into the spaces. The same bar code character is shown in FIG. 7B with all the edges of the bars bleeding 10% into the adjacent space. In a narrow bar, this would increase its size by 40% while decreasing a narrow space by the same 40%. If a unit module is randomly picked as ten pixels, then the first element of the start code 304 would have an ideal pixel count of 20. Ten percent bleeding on each side would expand this to a pixel count of 24 shown at 316. The noisy start code A run-length-encoded sequence will have pixel counts 24-6-14-36-14-16, which are shown respectively at 316–326.

STEP 2

Once all six elements of the sequence are shifted in, latch #6 of FIG. 3 (not shown) will hold the first element, a count of 24 and latch #1 68 will hold the last element, a count of 16. The math module 10 uses only Function A and sums the outputs of latches 1–6 (A–F). The high speed sum of 110 pixels becomes present at the output 62.

STEP 3

On the next bar code clock, the previously described sum of 110 pixels (appears on line 62 of FIG. 4B) is clocked into the five hardware scaling multipliers while the associated data in latches L1–L6 (FIG. 3) has been shifted to latches L2–L7 (L6–L9 not shown). The data multipliers 129–133 (FIG. 4B) are all set to A in this application. The sum defined by function A appears on line 62 and the associated constants K1–K5 are multiplied by that sum (FIG. 4B).

The products of these multipliers are the actual thresholds as follows:

1. Module length I lower limit: pixel sums of less than or greater than 0.5 module lengths.
2. Module length 1 upper limit and module length 2 lower limit: pixel sums of less than or greater than 1.5 module lengths.
3. Module length 2 upper limit and module length 3 lower limit: pixel sums of less than or greater than 2.5 module lengths.
4. Module length 3 upper limit and module length 4 lower limit: pixel sums of less than or greater than 3.5 module lengths.
5. Module length 4 upper limit: pixel sums of less than or greater than 4.5 module lengths.

The inputs to the multipliers are one 8-bit constant and one 12-bit sum. The 8-bit output is taken from most significant bits 15 to 8 of the 16-bit multiplications result. The module thresholds (MT) are the upper and lower normalized acceptable limits for each of the given module lengths 1 through 4 and are calculated by:

Module thresholds (MT)=(0.55, 1.55, 2.55, 3.55, 4.55)

(Note that 0.05 is added to each nominal threshold for rounding) The constants $K_1$ through $K_5$ are the integers that will be multiplied with the 6-element pixel sum, the result of which will be the non-normalized upper and lower pixel counts that define the various absolute module sizes.

$$K_N = (MT * 256) \div 11$$

Where 11 is the sum of all modules for a given character, 256 is the offset to use the high 8 bits of the 16 total bits of the multiplier output, and MT is the nominal Module Threshold limit between each module.

This produces constants $K_1$=12.8, $K_2$=36.1, $K_3$=59.3, $K_4$=4=82.6, $K_5$=105.9

To the best integer: $K_1$=12, $K_2$=36, $K_3$=59, $K_4$=82, $K_5$=105

So, for a running sum of 110 pixels for latches L3 to L8, one can deduce that for a valid 128 character, that a single module length would be ten pixels wide because, by definition, each character has 11 modules.

The pixel thresholds are calculated in Table 2 below:

TABLE 2

| Module Threshold | $K_N$ | Pixel Threshold = [$K_N$* (6 Element Pixel Sum) ÷ 256] |
| --- | --- | --- |
| 0.55 | 12 | 5.2 → 5 |
| 1.55 | 36 | 15.5 → 15 |
| 2.55 | 59 | 25.4 → 25 |
| 3.55 | 82 | 35.2 → 35 |
| 4.55 | 105 | 45.1 → 45 | where the pixel threshold is defined as the non-normalized upper and lower pixel counts that define the various absolute module sizes.

STEP 4

See FIG. 4 on the next significant barcode clock edge, associated data in latches L2–L7 will be shifted to latches L3–L8 and present at threshold range block 104 through threshold range block 109 (not shown) and the multiplied new thresholds are released from the multiplier output holding register within the multipliers. These thresholds are calculated from the sum Function A times the constants calculated above and shown in Table 2. All six threshold range blocks 104–109 (109 not shown in FIG. 4A) do multiple magnitude comparisons comparing the input runlength-encoded pixel count 92–97, (97 not shown in FIG. 4A) to the five newly calculated thresholds. If any of the counts exceed the 4.55 module threshold or fall below the 0.55 module threshold, the out-of-range bit for that element will be set and would not recognize a valid start code. The outputs of the threshold blocks are shown in Table 3.

TABLE 3

| Element Number | Pixel Count | Count > 4 and < 16 | Count > 15 and < 26 | Count > 25 and < 36 | Count > 35 and < 46 | Out-of-range | BC bits MSB-LSB |
|---|---|---|---|---|---|---|---|
| 1 | 24 | NO | YES | NO | NO | NO | 01(1) |
| 2 | 6 | YES | NO | NO | NO | NO | 00(0) |
| 3 | 14 | YES | NO | NO | NO | NO | 00(0) |
| 4 | 36 | NO | NO | NO | YES | NO | 11(3) |
| 5 | 14 | YES | No | NO | NO | NO | 00(0) |
| 6 | 16 | NO | YES | NO | NO | NO | 01(1) |

STEP 5

The 12 bar/space level bits from six threshold range blocks 104–109 (107–109 not shown in FIG. 4A) are fed into the start code detector block, FIG. 5, item 16. After the data becomes valid out from the threshold range blocks, the circuitry searches for a match of the start code being searched for. The module count for USS-128 start code "A" is 2-1-1-4-1-2 or zero-based in 1-0-0-3-0-1. The start code block 16 is programmed to recognize this pattern. The element pattern in column 8 of Table 3 has the thresholded pattern 1-0-0-3-0-1 which matches the start code A. This would generate a start code detect.

If a valid start code has been detected, then the threshold latch blocks 116 are frozen with the current thresholds and not updated. The 12 bar/space level bits (BC11 through BC0) are then sent to the PROM lookup table (FIG. 5, item 258) to extract the ASCII representation of the bar-space pattern after the next six elements have been shifted into the system.

STEP 6

After six more barcode clock cycles 26, look up the next valid ASCII data character in a similar manner.

STEP 7

On every sixth barcode clock cycle, after a valid start code has been detected, the start/stop code detect logic circuitry checks for matches to the stop code in a similar manner to the detection of the start code. If a bar or space is missed within a character within the bar code, then the actual reading of all subsequent characters will be in error. It is then necessary to check for stop codes asynchronously to the believed character edge. An upper limit to the number of characters read would also terminate the reading and decoding sequence.

STEP 8

The Post-Processing Stage. Once the stop code has been triggered, the bar code data is ready to be analyzed by the host processor. It is important to note that the processor has done NONE of the bar code decoding! However, the processor will validate that the check sum character is correct, and interpret shift characters or code switches to double density numeric format, for example. The resulting string will be passed on to the user of the bar code data.

In applications where the image of the bar code is acquired from an object with a flat surface, the bars and spaces of the bar code will have virtually the same size elements on the left side of the imaged bar code as on the right side. In this application, it is appropriate to rely on the latched threshold levels established after the start character has been located for the duration of the decode process for that bar code. However, in applications where the object being imaged is of a curved nature such as a cylinder, the size of the left side of the bar code will not appear the same as the middle or right side may appear. In an application such as this, it is desirable to re-establish new threshold levels after every character or every two characters depending on the radius of the arc being viewed. This compensates for any distortion that may occur as the bar code is being decoded on the curved surface. The thresholds are adjusted gradually to accommodate the charging aspect ratio of the acquired bar code.

This invention has been described in detail with particular reference to the preferred embodiment thereof, but it will be understood that variations and modifications can be effected within the spirit and scope of the invention.

I claim:

1. A bar code reading apparatus for reading printed bars and spaces, each defining an element having a predetermined number of modules per element, said apparatus comprising:

a) means for scanning an item and generating a data signal;

b) means for converting said data signal to a run-length-count of pixels per element;

c) means for loading a next element run length count into a sequential latch array;

d) means for summing the run length count for a predetermined number of elements in the sequential latch array;

e) means for comparing the run length count in each latch in the sequential latch array to a plurality of threshold values to determine if the run length count is within a range associated with a valid bar code element;

f) means for determining the number of modules associated with each element;

g) means for identifying an initializing pattern; and h) means for accessing a look-up table to decode character information based on the number of modules in each element after detection of the initializing pattern.

2. A bar code reading apparatus as set forth in claim 1 wherein the comparing means compares a module count to a stop code pattern and when a match is made, the means for accessing the look-up table is inhibited.

3. A bar code reading apparatus as set forth in claim 2 wherein a decoding of a start code pattern establishes for the duration of the decoding of that bar code, a plurality of threshold values used to define the number of modules per element.

4. A bar code reading apparatus as set forth in claim 1 wherein said apparatus further includes means for generating multiple ranges of run length count sums for specific elements.

5. A bar code reading apparatus as set forth in claim 1 wherein said apparatus further includes means for comparing the run length count of a given element to a plurality of threshold values to determine if the given element is larger or smaller than a valid bar code element.

6. A bar code reading apparatus as set forth in claim 1 wherein said apparatus further includes means for inhibiting a start code if any one element in the bar code is larger or smaller than a valid bar code element size.

7. A bar code reading apparatus as set forth in claim 1 wherein said apparatus further includes means for locking and holding a plurality of threshold values after the detection of a start code.

8. A bar code reading apparatus as set forth in claim 1 wherein the initializing pattern takes the form of guard bars on either side of a predetermined number of characters.

9. A bar code reading apparatus as set forth in claim 8 wherein said apparatus further includes means for selecting a second look-up table after identifying said predetermined pattern of guard bars.

10. An apparatus for reading a bar code which includes a sequence of printed bars and spaces, either or both of the bars and spaces having at least two different width standards associated therewith, each bin and space constituting an element, the apparatus comprising:

a) an optical reader for scanning the bars and spaces of the bar code;
   b) means for generating width values, each value including a count which is representative of the width of a respective element, the generating means being coupled to the optical reader and including means for determining when the optical reader is scanning a bar or a space;
   c) means for sequentially loading the counts into a latch array;
   d) means for comparing the count of a given element to a plurality of threshold values that define a number of modules per element;
   e) means for identifying an initializing pattern; and
   f) means for comparing a module count of each element in a look-up table to decode character information based on a number of modules in each element after detection of an initializing pattern.

11. An apparatus for reading bar codes as set forth in claim 10 wherein said apparatus further includes means for passing and buffering decoded character information to a host system using a logic memory device.

12. An apparatus for reading bar codes as set forth in claim 10 wherein said apparatus further includes means for releasing said threshold values used to define the number of modules per element at the detection of a stop code.

13. A method of reading bar codes having printed bars and spaces, each defining an element having a predetermined number of modules per bar or space, with a predetermined number of modules per element and a predetermined number of elements forming a character in said bar code, said method comprising the steps of:

a) scanning an item and generating a data signal;
   b) converting said data signal to a run-length count of pixels per bar or space;
   c) sequentially storing the run-length data;
   d) summing the run-length counts of pixels after a predetermined number of elements have been stored;
   e) comparing counts of each given element to multiple threshold values to define the number of modules per element;
   f) comparing the module count of each element to a predetermined initializing pattern; and
   g) accessing a look-up table to decode character information based on the module count of each element after detection of the initializing pattern has been detected.

14. The method as set forth in claim 13 wherein the comparing step compares a module count to a stop code pattern and when a match is made accessing of the look-up table is inhibited.

15. The method as set forth in claim 13 wherein the decoding of a start code pattern permanently establishes, for the duration of the decoding of that bar code, threshold values used to define the number of modules per element.

16. A method of reading bar codes as set forth in claim 15 wherein said method further includes step for terminating a bar code reading sequence if a specified number of valid bar code characters were decoded.

17. A method of reading bar codes as set forth in claim 14 wherein said method further includes the step of terminating a bar code reading if the number of decoded characters is greater than, less than, or equal to a predetermined number of characters.

18. A method of reading bar codes having a sequence of printed bars and spaces, either or both of the bars or spaces having at least two different width standards associated therewith, the method comprising the following steps:

a) scanning the bars and spaces of a bar code;
   b) generating width values, each value including a count which is representative of the width of a respective bar or space, the generation of width values is coupled to the scanning of the bars and spaces of the bar code and include a step to determine when a bar or space is being scanned;
   c) storing in memory a total count for each character which is represented by a total count of each element;
   d) comparing the count of a given element to a plurality of threshold values that define a number of modules per element;
   e) comparing a module count of each element to a predetermined start code pattern; and
   f) accessing a look-up table to decode character information based on the number of modules per element after a start code has been detected.

19. A method of reading bar codes as set forth in claim 18 wherein the method further includes the step of counting number of elements that have been scanned after the start code.

20. A method of reading bar codes as set forth in claim 18 wherein the method further includes the step establishing new multiple ranges of counts that define the total count of each element after a predetermined number "n" of elements have been read, where n is the number of elements in the target bar code.

* * * * *